US008559820B2

(12) United States Patent
Hanawa

(10) Patent No.: US 8,559,820 B2
(45) Date of Patent: Oct. 15, 2013

(54) OPTICAL COMMUNICATION SYSTEM, OPTICAL TRANSMITTER, OPTICAL RECEIVER AND METHODS, AND CORRELATORS USED THEREFOR

(75) Inventor: Masanori Hanawa, Kofu (JP)

(73) Assignee: University of Yamanashi, Kofu-shi, Yamanashi (JP)

( * ) Notice: Subject to any disclaimer, the term of this patent is extended or adjusted under 35 U.S.C. 154(b) by 278 days.

(21) Appl. No.: 12/982,311

(22) Filed: Dec. 30, 2010

(65) Prior Publication Data

US 2011/0097079 A1 Apr. 28, 2011

Related U.S. Application Data

(63) Continuation of application No. PCT/JP2009/062567, filed on Jul. 3, 2009.

(30) Foreign Application Priority Data

Jul. 3, 2008 (JP) ................................. 2008-174235

(51) Int. Cl.
H04J 14/00 (2006.01)
(52) U.S. Cl.
USPC ................ 398/78; 398/77; 398/79; 398/158; 398/159; 398/201; 398/183; 398/192; 398/202; 398/212; 398/87; 385/24; 385/37; 385/14; 385/27
(58) Field of Classification Search
USPC ............... 398/77, 78, 79, 183, 188, 202, 212, 398/213, 214, 208, 209, 158, 159, 81, 89, 398/87, 141, 200, 201, 192, 193, 194; 385/24, 37, 27, 14, 31, 39
See application file for complete search history.

(56) References Cited

U.S. PATENT DOCUMENTS

| 7,174,103 B2 * | 2/2007 | Nishiki et al. .................. 398/77 |
| 2002/0176140 A1 * | 11/2002 | Davis ............................ 359/173 |
| 2003/0035187 A1 * | 2/2003 | Richardson et al. .......... 359/189 |

FOREIGN PATENT DOCUMENTS

| JP | 2007-88859 A | 4/2007 |
| WO | WO 2006/130742 A1 | 12/2006 |

OTHER PUBLICATIONS

H. Sotobayashi et al., "1.6-b/s/Hz 6.4-Tb/s QPSK-OCDM/WDM (4 OCDM×40 WDM×40 Gb/s) Transmission Experiment Using Optical Hard Thresholding", IEEE Photonics Technology Letters, vol. 14, No. 4, Apr. 2002, pp. 555-557.

(Continued)

Primary Examiner — Hanh Phan
(74) Attorney, Agent, or Firm — Birch, Stewart, Kolasch & Birch, LLP

(57) ABSTRACT

A complex orthogonal code in the present invention is one in which each row of a square matrix of N rows and N columns in which an element of an mth row and nth column is $\exp[2\pi j(m-1)(n-1)/N]$ (where j is an imaginary unit) is adopted as a code word. An optical orthogonal code for Optical Code Division Multiplexing/Optical Code Division Multiple Access (OCDM/OCDMA) is realized by a train of N-number of optical pulses corresponding to the argument (phase) of the code elements. An optical transmitter or optical receiver includes an optical correlator provided with a sampled Bragg grating having a plurality of Bragg gratings disposed serially at regular intervals inside an optical waveguide. The optical correlator is allocated any one of the code words. In the optical transmitter, an optical signal to be transmitted is encoded by the optical correlator. In the receiver, a received optical signal is decoded by the optical correlator. A high autocorrelation output is obtained only in a case where the code word used to encode the received optical signal and the code word allocated to the optical receiver match.

10 Claims, 12 Drawing Sheets

(56) References Cited

OTHER PUBLICATIONS

International Search Report for PCT/JP2009/062567, mailed on Aug. 11, 2009.

L. C. Tran et al., "Complex Orthogonal Sequences from Amicable Hadamard Matrices", IEEE 59th Vehicular Technology Conference, vol. 3, May 17-19, 2004, pp. 1490-1493.

M. Hanawa et al., "BER characteristics of OCDM loop-back transmission using SSFBG based optical correlators", IEICE, B-10-104, Mar. 5, 2008, p. 387.

M. Hanawa, "Fourier Code: A Novel Multi Phase Orthogonal Code for OCDM/OCDMA", IEICE, B-10-75, Sep. 2, 2008, p. 218.

M. Hanawa, "Fourier code: a novel orthogonal code for OCDM systems", Opto-Electronics and Communications Conference, 2008 and the 2008 Australian Conference on Optical Fibre Technology. OECC/ACOFT 2008. Joint conference of the Jul. 7-10, 2008, p. 1-2.

M. Hanawa, "Multiple access interference of OCDM/OCDMA using Fourier Code", IEICE, B-10-60, Mar. 4, 2009, p. 379.

P. C. Teh et al., "Demonstration of a Four-Channel WDM/OCDMA System Using 255-Chip 320-Gchip/s Quaternary Phase Coding Gratings", IEEE Photonics Technology Letters, vol. 14, No. 2, Feb. 2002, pp. 227-229.

S. Bortas et al., "4-Phase Sequences with Near-Optimum Correlation Properties", IEEE Transactions on Information Theory, vol. 38, No. 3, May 1992, pp. 1101-1113.

Written Opinion of the International Search Authority, dated on Aug. 11, 2009, issued in PCT/JP2009/062567.

Y. Okamura et al., "A study of FBG based variable encoder/decoder for OCDM systems", Technical Report of IEICE, OCS2004-50, Jun. 2004, pp. 61-66.

\* cited by examiner

*Fig. 1A*

$$\mathbf{F}_4 = \begin{bmatrix} e^{j0} & e^{j0} & e^{j0} & e^{j0} \\ e^{j0} & e^{j\pi/2} & e^{j\pi} & e^{j3\pi/2} \\ e^{j0} & e^{j\pi} & e^{j2\pi} & e^{j3\pi} \\ e^{j0} & e^{j3\pi/2} & e^{j6\pi/2} & e^{j9\pi/2} \end{bmatrix}$$

$$= \begin{bmatrix} +1 & +1 & +1 & +1 \\ +1 & +j & -1 & -j \\ +1 & -1 & +1 & -1 \\ +1 & -j & -1 & +j \end{bmatrix} = \begin{bmatrix} \overline{\mathbf{c}}_1 \\ \overline{\mathbf{c}}_2 \\ \overline{\mathbf{c}}_3 \\ \overline{\mathbf{c}}_4 \end{bmatrix}$$

*Fig. 1B*

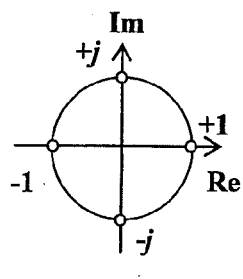

*Fig. 1C*

$$\Delta \mathbf{F}_4 = \begin{bmatrix} \begin{bmatrix} 0 \\ \pi/2 \\ \pi \\ 3\pi/2 \end{bmatrix} & \begin{bmatrix} 0 \\ \pi/2 \\ \pi \\ 3\pi/2 \end{bmatrix} & \begin{bmatrix} 0 \\ \pi/2 \\ \pi \\ 3\pi/2 \end{bmatrix} \end{bmatrix}$$

*Fig. 2*

$$\mathbf{F}_8 = \begin{bmatrix} e^{j0} & e^{j0} & e^{j0} & e^{j0} & e^{j0} & e^{j0} & e^{j0} & e^{j0} \\ e^{j0} & e^{j\pi/4} & e^{j2\pi/4} & e^{j3\pi/4} & e^{j4\pi/4} & e^{j5\pi/4} & e^{j6\pi/4} & e^{j7\pi/4} \\ e^{j0} & e^{j2\pi/4} & e^{j4\pi/4} & e^{j6\pi/4} & e^{j8\pi/4} & e^{j10\pi/4} & e^{j12\pi/4} & e^{j14\pi/4} \\ e^{j0} & e^{j3\pi/4} & e^{j6\pi/4} & e^{j9\pi/4} & e^{j12\pi/4} & e^{j15\pi/4} & e^{j18\pi/4} & e^{j21\pi/4} \\ e^{j0} & e^{j4\pi/4} & e^{j8\pi/4} & e^{j12\pi/4} & e^{j16\pi/4} & e^{j20\pi/4} & e^{j24\pi/4} & e^{j28\pi/4} \\ e^{j0} & e^{j5\pi/4} & e^{j10\pi/4} & e^{j15\pi/4} & e^{j20\pi/4} & e^{j25\pi/4} & e^{j30\pi/4} & e^{j35\pi/4} \\ e^{j0} & e^{j6\pi/4} & e^{j12\pi/4} & e^{j18\pi/4} & e^{j24\pi/4} & e^{j30\pi/4} & e^{j36\pi/4} & e^{j42\pi/4} \\ e^{j0} & e^{j7\pi/4} & e^{j14\pi/4} & e^{j21\pi/4} & e^{j28\pi/4} & e^{j35\pi/4} & e^{j42\pi/4} & e^{j49\pi/4} \end{bmatrix}$$

$$= \begin{bmatrix} +1 & +1 & +1 & +1 & +1 & +1 & +1 & +1 \\ +1 & e^{j\pi/4} & +j & e^{j3\pi/4} & -1 & e^{j5\pi/4} & -j & e^{j7\pi/4} \\ +1 & +j & -1 & -j & +1 & +j & -1 & -j \\ +1 & e^{j3\pi/4} & -j & e^{j\pi/4} & -1 & e^{j7\pi/4} & +j & e^{j5\pi/4} \\ +1 & -1 & +1 & -1 & +1 & -1 & +1 & -1 \\ +1 & e^{j5\pi/4} & +j & e^{j7\pi/4} & -1 & e^{j\pi/4} & -j & e^{j3\pi/4} \\ +1 & -j & -1 & +j & +1 & -j & -1 & +j \\ +1 & e^{j7\pi/4} & -j & e^{j5\pi/4} & -1 & e^{j3\pi/4} & +j & e^{j\pi/4} \end{bmatrix}$$

$$= \begin{bmatrix} \bar{\mathbf{c}}_1 & \bar{\mathbf{c}}_2 & \bar{\mathbf{c}}_3 & \bar{\mathbf{c}}_4 & \bar{\mathbf{c}}_5 & \bar{\mathbf{c}}_6 & \bar{\mathbf{c}}_7 & \bar{\mathbf{c}}_8 \end{bmatrix}$$

US 8,559,820 B2

OPTICAL COMMUNICATION SYSTEM, OPTICAL TRANSMITTER, OPTICAL RECEIVER AND METHODS, AND CORRELATORS USED THEREFOR

CROSS REFERENCE TO RELATED APPLICATION

This application is a Continuation-in-Part of PCT International Application No. PCT/JP2009/062567 filed on Jul. 3, 2009, which claims priority under 35 U.S.C. 119(a) to Patent Application No. 2008-174235 filed in Japan, on Jul. 3, 2008. The entire contents of all of the above applications is hereby incorporated by reference into the present application.

TECHNICAL FIELD

This invention relates to an optical communication system. More particularly, the invention relates to an optical communication system that employs Optical Code Division Multiplexing (OCDM) or Optical Code Division Multiple Access (OCDMA), an optical transmitter and optical receiver for this system, an optical communication method, optical transmission method and optical receiving method, and correlators used therefor.

BACKGROUND ART

With Code Division Multiplexing/Code Division Multiple Access, multiplexing/multiple access is realized utilizing code orthogonality. With these systems, an orthogonal code functions as one type of key. A signal encoded by an orthogonal code is capable of being received only by an autocorrelation signal obtained in a case where the signal has been decoded by the same orthogonal code; it is not receivable with a cross-correlation signal obtained in a case where the signal has been decoded using a different orthogonal code. This technology is in wide practical use in electrical communication as a multiple access scheme for mobile telephones and wireless LANs.

Recent years have seen great activity in research and development of Optical Code Division Multiplexing (OCDM)/Optical Code Division Multiple Access (OCDMA) techniques, in which the above-mentioned Code Division Multiplexing/Code Division Multiple Access technology is applied to optical fiber communication systems. With OCDM/OCDMA, often use is made of optical encoding/optical decoding technology and orthogonal code suited to optical processing is desired. OCDM/OCDMA also employs Gold code and binary Hadamard code, which express a code by two phase states (example: $0, \pi$) of a carrier wave generally used in electrical communication. With a Gold code, however, a long code is necessary in order to reduce cross-correlation signals (i.e., interference from other channels at the time of multiplexing/multiple access). Further, with a binary Hadamard code, code combinations in which the side lobes of cross-correlation signals cannot be reduced exist, and the binary Hadamard code can only be used in synchronous OCDM/OCDMA in which all multiplexed/multiple channels are synchronized. With the aim of solving these problems, use of 4-value codes for expressing codes by four phase states (example: $0, \pi/2, \pi, 3\pi/2$) of a carrier wave is being studied. For example, refer to the following literature:

1. P. C Teh, M. Ibsen, H. Lee, P. Petropoulos, D. J. Richardson, "Demonstration of a Four-Channel WDM/OCDMA System Using 255-Chip 320-Gchip/s Quarternary Phase Coding Gratings", IEEE PHOTONICS TECHNOLOGY LETTERS, vol. 14, no. 2, 2002
2. H Sotobayashi, W. Chujo K. Kitayama, "1.6 b/s/Hz 6.4-Tb/s QPSK-OCDM/WDM (4OCDM×40 WDM×40 Gb/s) Transmission Experiment Using Optical Hard Thresholding", IEEE PHOTONICS TECHNOLOGY LETTERS, vol. 14, no. 4, 2002
3. S. Boztas, R. Hammons, P. V. Kumar, "4-Phase Sequences with Near-Optimum Correlation Properties," IEEE Trans. Inform. Theory, vol. 38, no. 3, pp. 1101-1113, May 1992
4. L. C. Tran, J. Seberry, B. J. Wysocki, T. A. Wysocki, T. Xia and Ying Zhao, "Complex Orthogonal Sequences from Amicable Hadamard Matrices," IEEE 59th Vehicular Technology Conference, Vol. 3, pp. 1490-1493, May 2004

Reference 1 reports on an OCDM system in which a four-value code (family A sequence code) referred to as a "family A sequence" proposed in Reference 2 is applied to OCDM and encoding/decoding to a family A sequence of code length 255 is performed by a superstructured fiber Bragg grating (SSFBG). However, since the device structure of an SSFBG is fixed when it is created, it is necessary to create one SSFBG with respect to one family A sequence in a case where the family A sequence code is used. Further, in order to increase the number of code sequences with the family A sequence code (i.e., in order to increase the number of multiplexed/multiple channels), a long code length is required. This makes it difficult to obtain a compact SSFBG-type encoder/decoder. In actuality, the SSFBG-type encoder/decoder utilized in Reference 1 has an overall length of 80 mm.

In Reference 3 also a 4-value code of code length 3 is utilized as an orthogonal code for OCDM. A code system, however, is not indicated. Further, Reference 4 reports on a computer search for converting a binary Hadamard code to obtain a multivalued Hadamard code. However, since a code cannot be obtained systematically, it is difficult in practice to obtain important information, such as the maximum number of code sequences and maximum cross-correlation value capable of being acquired in a certain code length. Further, it is required that the conversion matrix be found using a heuristic search algorithm, and as code length grows longer, it is difficult to finish the search in polynomial time.

Thus, a multivalued orthogonal code system for OCDM/OCDMA suited to encoding/decoding based upon optical processing, in which cross-correlation values are kept low, does not exist.

DISCLOSURE OF THE INVENTION

The present invention provides an optical communication system, optical transmitter, optical receiver, optical communication method, optical transmission method and optical receiving method, as well as correlators used thereby, applicable to encoding/decoding based upon optical processing in an OCDM/OCDMA system and capable of holding cross-correlation values low.

The present invention further provides a general-purpose optical correlator suited to both encoding and decoding.

A further object of the present invention is to so arrange it that interference in code multiplexing can be reduced in an optical receiver.

An optical communication system according to the present invention includes the above-mentioned optical transmitter and optical receiver. The optical transmitter includes an optical correlator, which has been allocated a code word of a complex orthogonal code of code length N represented by any row of an N×N square matrix in which an element of an mth row and nth column is $\exp[2\pi j(m-1)(n-1)/N]$ (where j is an imaginary unit), for optically encoding an optical signal, which is to be transmitted, by this code word. The receiver includes an optical correlator, which has been allocated a code word of a complex orthogonal code of code length N represented by any row of an N×N square matrix in which an element of an mth row and nth column is $\exp[2\pi j(m-1)(n-1)/N]$ (where j is an imaginary unit), for optically decoding a received optical signal by this code word.

The above-mentioned optical communication system includes a maximum N-number of optical transmitters and a maximum N-number of optical receivers, the optical correlator of each optical transmitter has been allocated a respective different code word, and the optical correlator of each optical receiver has been allocated a code word identical with that allocated to the optical correlator of the corresponding optical transmitter.

A strong autocorrelation optical signal is obtained in an optical receiver that has been allocated a code word identical with the code word used when the optical signal was encoded in the optical transmitter. A very weak cross-correlation optical signal is obtained in an optical receiver to which a different code word has been allocated. Even when an optical signal is multiplexed and transmitted, therefore, only a specific optical receiver will decode data that has been transmitted from the corresponding optical transmitter. Thus, optical communication based upon the OCDM or OCDMA scheme is realized.

An optical transmitter according to the present invention includes an optical correlator. The optical correlator has been allocated a code word of a complex orthogonal code of code length N represented by any row of an N×N square matrix in which an element of an mth row and nth column is $\exp[2\pi j(m-1)(n-1)/N]$ (where j is an imaginary unit), generates N-number of light waves from a light wave representing an optical signal to be transmitted, and produces phase differences, which are defined by the allocated code word, between adjacent ones of these N-number of light waves on a time axis. An optical signal to be transmitted is encoded by this optical correlator.

In an embodiment, the N-number of light waves are a train of N-number of optical pulses, and the phase state of the carrier wave of each optical pulse corresponds to an argument of an element of the code word of the complex orthogonal codes that has been allocated to the optical transmitter and represents an optical orthogonal code for OCDM/OCDMA.

An optical receiver according to the present invention includes an optical correlator. The optical correlator has been allocated a code word of a complex orthogonal code of code length N represented by any row of an N×N square matrix in which an element of an mth row and nth column is $\exp[2\pi j(m-1)(n-1)/N]$ (where j is an imaginary unit), outputs an optical signal representing strong autocorrelation in a case where this code word is identical with a code word that was used to encode a received optical signal, and outputs an optical signal representing autocorrelation that is weak in comparison with the cross-correlation output in a case where the code word is different.

The optical receiver further has a photoelectric converting circuit for photoelectrically converting an optical correlation signal, which is output from the optical correlator, and outputting an electrical signal; and a low-pass filter for reducing (blocking) multiplexed interference signals, which have been produced owing to encoding by code words of complex orthogonal codes other than the code word that has been allocated to the optical correlator, from the output electrical signal of this photoelectric converting circuit. As a result, multiplexed interference signals encoded by complex orthogonal codes other than that desired can be reduced. That is, a reduction in optical code division multiplex noise is realized.

The present invention further provides an optical correlator adapted so as to generate N-number of light waves from a light wave representing an optical signal to be transmitted and produce phase differences between adjacent ones of these N-number of light waves on a time axis, the phase differences being defined by a code word of a complex orthogonal code of code length N represented by any row of an N×N square matrix in which an element of an mth row and nth column is $\exp[2\pi j(m-1)(n-1)/N]$ (where j is an imaginary unit).

The above-mentioned optical correlator can be implemented using a sampled Bragg grating. Specifically, the present invention provides an optical correlator. The optical correlator includes a sampled Bragg grating having a plurality of Bragg gratings, which have been allocated a code word of a complex orthogonal code of code length N represented by any row of an N×N square matrix in which an element of an mth row and nth column is $\exp[2\pi j(m-1)(n-1)/N]$ (where j is an imaginary unit), and which are disposed serially at regular intervals inside an optical waveguide, reflectivities of these Bragg gratings being adjusted in conformity with amplitude of the allocated code word, and phase differences of light waves reflected by adjacent Bragg gratings being adjusted in conformity with phase differences between adjacent elements of the allocated code word; and an optical circulator for introducing an input optical signal to the sampled Bragg grating and extracting reflected light waves that are output from the sampled Bragg grating.

The above-described sampled Bragg grating is a sampled optical fiber Bragg grating in an embodiment. The optical waveguide of the sampled Bragg grating may be an optical fiber or a planar optical waveguide.

A general-purpose optical correlator capable of implementing all or many code words based upon the above-mentioned complex orthogonal code further has physical-quantity application means for applying a physical quantity to a portion or the entirety of the optical waveguide of the sampled Bragg grating, thereby changing the phase differences or Bragg reflection wavelengths of light waves reflected by adjacent Bragg gratings, and holding these at desired values.

The phase differences or Bragg reflection wavelengths of the light waves can be changed to desired values by adjusting the applied physical quantity.

Such a general-purpose correlator or code switcher is also obtained by: using an optical correlator having (1×N)-number of optical demultiplexers, N-number of parallel optical waveguides and (N×1)-number of optical multiplexers and adjusted in such a manner that propagation delay time differences of other parallel optical waveguides in which one waveguide among the N-number of parallel optical waveguides serves as a reference will correspond to time differences between a leading pulse and other pulses of the desired complex orthogonal code, and such that carrier wave phases of each of the optical pulses that are output from the parallel optical waveguides will correspond to phase differences between a leading pulse and other pulses of the desired complex orthogonal code; and shifting the operating wavelength of the optical correlator with respect to the wavelength of the carrier wave of the optical signal that impinges upon the optical correlator.

The present invention further provides an optical communication method, optical transmission method and optical receiving method that employ the above-described optical communication system, optical transmitter and optical receiver. The present invention further provides a code changeover method in an optical correlator.

A code changeover method according to the present invention uses an optical correlator including: a sampled Bragg grating having a plurality of Bragg gratings disposed serially at regular intervals inside an optical waveguide, reflectivities of these Bragg gratings being adjusted in conformity with amplitude of one code word of a complex orthogonal code of code length N in which each row of an N×N square matrix in which an element of an mth row and nth column is exp[2πj (m−1)(n−1)/N] (where j is an imaginary unit) is adopted as a code word, and phase differences of light waves reflected by adjacent Bragg gratings being adjusted in conformity with phase differences between adjacent elements of one code word of the complex orthogonal code; and a mechanism for introducing an input optical signal to the sampled Bragg grating by an optical circulator and extracting reflected light waves, which are output from the sampled Bragg grating, by the optical circulator; applies a physical quantity to a portion or the entirety of the optical waveguide of the sampled Bragg grating, thereby changing the phase differences or Bragg reflection wavelengths of light waves reflected by adjacent Bragg gratings, and holds these at desired values, thereby changing over the one code word of the complex orthogonal code to another code word obtained from a different row of the same square matrix in the optical correlator.

Thus, in accordance with the present invention, it is possible to realize an optical communication system, an optical transmitter, an optical receiver and an optical correlator that employs complex orthogonal codes for OCDM/OCDMA suited to encoding/decoding based upon optical processing, in which cross-correlation values are kept low.

BRIEF DESCRIPTION OF THE DRAWINGS

FIG. 1A illustrates one example of a complex orthogonal code (in case of N=4), FIG. 1B illustrates a complex plane, and FIG. 1C illustrates phase differences represented by code words of a complex orthogonal code;

FIG. 2 illustrates another example of a complex orthogonal code (in case of N=8);

BEST MODE FOR CARRYING OUT THE INVENTION

A code used in optical communication based upon Optical Code Division Multiplexing (OCDM) or Optical Code Division Multiple Access (OCDMA) in the present invention is a complex orthogonal code of code length N using as a code word each row of an N×N square matrix in which an element of an mth row and nth column is represented by the following:

$$\exp\left[j\frac{2\pi(m-1)(n-1)}{N}\right] \qquad \text{Eq. (1)}$$

(m, n=1, 2, ..., N)
(j is an imaginary unit)

An example of a square matrix that gives complex orthogonal codes in a case where N=4 holds is represented in FIG. 1A [this shall be referred to as "Equation (2)"]. Rows $c_1$, $c_2$, $c_3$, $c_4$ are respective code words based upon the complex orthogonal code [in this specification, the bar over $c_i$ (i=1 to N) is omitted]. The meaning of each code can be understood in the complex plane shown in FIG. 1B.

An example of a square matrix that gives complex orthogonal codes in a case where N=8 holds is represented in FIG. 2 [this shall be referred to as "Equation (3)"]. Rows $c_1$ to $c_8$ are respective code words of code length 8 based upon the complex orthogonal code.

Figure 3:
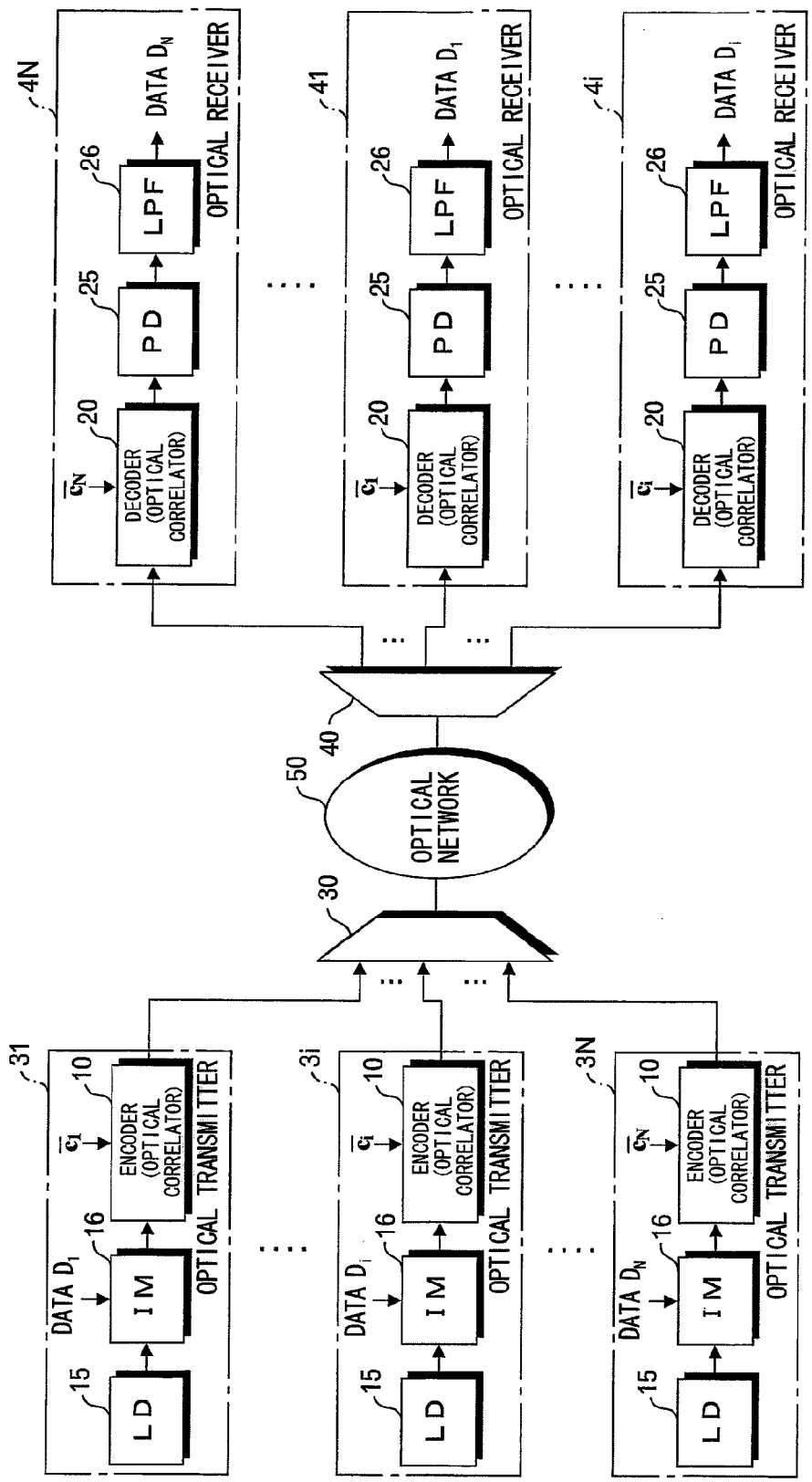
FIG. 3 is a block diagram illustrating an optical communication system based upon Optical Code Division Multiplexing or Optical Code Division Multiple Access.

FIG. 3 illustrates an example of a communication system using the above-mentioned code words. It is possible for data to be sent and received between a maximum of N transmitters and a maximum of N receivers (a maximum of N channels). More specifically, on the transmitting side, an optical signal (data) to be transmitted is encoded by each of N-number of different complex orthogonal codes $c_1$ to $c_n$ ($c_i$: i=1 to N), and on the receiving side, received light is decoded by the corresponding complex orthogonal code and the data is extracted. Multiplexed transmit optical signals can each be demultiplexed owing to the orthogonality of the complex orthogonal codes.

In each transmitter 3$i$ (i=1 to N), pulsed laser light (an optical pulse train) of pulses of very narrow pulse width repeated at regular time intervals is generated from a laser diode (laser light source) 15. The series of pulsed laser light pulses is intensity-modulated in an intensity (amplitude) modulator (IM) 16 by data $D_i$ to be transmitted. The data modulation is not limited to intensity modulation. For example, differential phase-shift keying (DPSK), etc., can also be used. The output optical signal from the intensity modulator 16 is encoded in an encoder 10 (an optical correlator, described later) using the complex orthogonal code word $c_i$ that has been allocated thereto.

The encoded optical signals that are output from the N-number of transmitters 31 to 3N are multiplexed by a combiner 30 and sent to an optical network 50.

On the receiving side, the multiplexed optical signal that arrives via the optical network 50 is split into N-number of identical optical signals by a power splitter 40 and are transmitted to respective ones of receivers 4$i$.

Each receiver 4*i* includes a decoder 20 (an optical correlator, described later), and a specific code word $c_i$ from among the N-number of complex orthogonal code words is allocated to each decoder 20. An optical signal that has been input to receiver 4*i* is decoded in the encoder 20 using the complex orthogonal code word that has been allocated thereto. Accordingly, even though optical signals are multiplexed, a high autocorrelation signal is obtained in the specific optical receiver 4*i* only with regard to an optical signal that was encoded by the optical transmitter 3*i* using the code word $c_i$ identical with the code word $c_i$ allocated to this receiver 4*i*; a low cross-correlation signal results with regard to an optical signal that was encoded by another optical transmitter. Only an optical signal transmitted from a corresponding specific optical transmitter 3*i*, therefore, is extracted.

The optical correlation signal that is output from the decoder is converted to an electrical correlation signal by a photodiode (photodetector) 25, and the electrical correlation signal obtained by this photoelectric conversion is applied to an electrical low-pass filter 26. Multiplexed interference signals produced by the encoding using complex orthogonal codes other than the complex orthogonal code that has been allocated to this receiver 4*i* are reduced (blocked).

Specifically, it is necessary to adjust the cut-off frequency of the electrical low-pass filter 26 so as to be equal to or greater than the repetition frequency of the optical pulse train that is input to the encoder 10 (optical correlator) of transmitter 3*i* and, moreover, so as to be sufficiently low in comparison with a frequency given by the reciprocal of a time interval Ts, between adjacent FBG-reflected light waves, decided by the spacing between adjacent sub-FBGs of an SFBG 11, described below.

Figure 4:
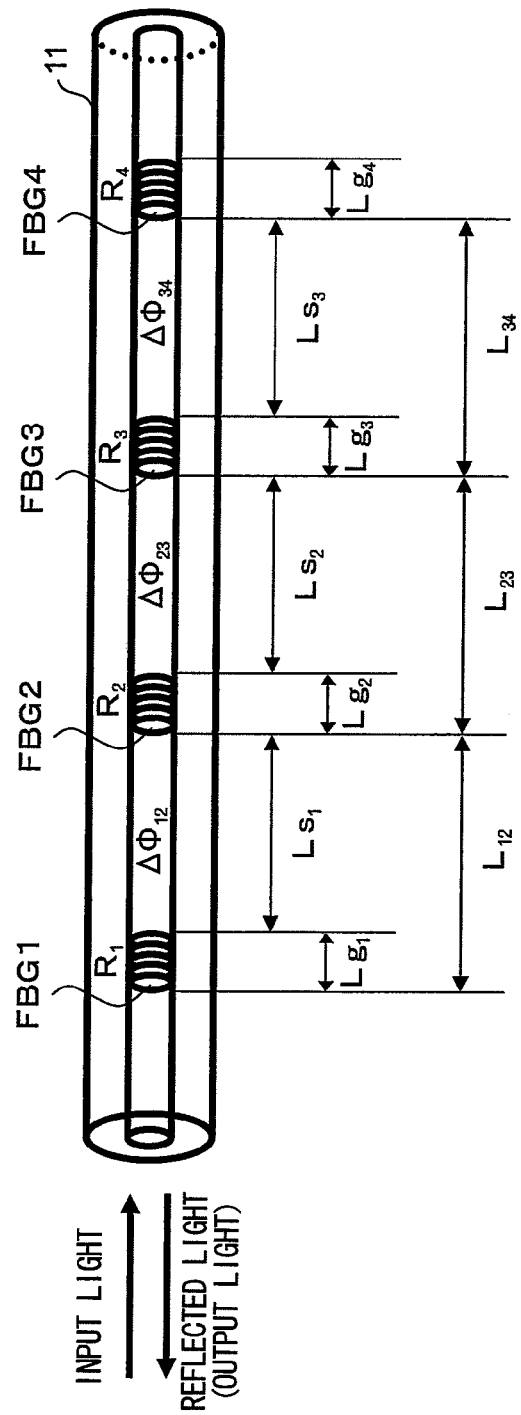
FIG. 4 schematically illustrates the configuration of a sampled fiber Bragg grating (SFBG)

FIG. 4 schematically illustrates the Sampled Fiber Bragg Grating (SFBG) used by the optical correlator in the above-mentioned encoder 10 or decoder 20. The SFBG 11 corresponds to one code word of complex orthogonal code of code length 4.

In general, a fiber Bragg grating (FBG) is a fiber-type device in which periodic refractive-index modulation (change) is applied to the core of an optical fiber to form a diffracting grating. When incident light enters the fiber, light of a specific wavelength (the Bragg wavelength) satisfying the following Bragg requirement:

$$\lambda_{Bragg} = 2n_{eff}\Lambda \quad \text{Eq. (4)}$$

is strongly reflected (diffracted). Here $\Lambda$ is the period of refractive-index modulation in the FBG, and $n_{eff}$ is the effective refractive index of the core of the fiber. This diffraction grating is referred to as a "sub-FBG".

The SFBG is obtained by placing a plurality of sub-FBGs inside an optical fiber discretely (i.e., at intervals) in serial fashion (along the axial direction of the optical fiber). Since the SFBG 11 shown in FIG. 4 corresponds to one code word of complex orthogonal code of code length 4, four of the sub-FBGs are provided. These four sub-FBGs are denoted by the reference symbols FBG1, FBG2, FBG3, FBG4 starting from the light input/output end (the left end in FIG. 4) [when these are referred to collectively, or when a specific one is indicated representatively, the term used will be simply FBG or FBGi (i=1 to 4)].

Let the length of each sub-FBGi be $Lg_i$ (i=1 to 4), let the length of the gap (non-FGB portion) between two adjacent sub-FBGs FBGi and FBG(i+1) be $Ls_i$ (i=1 to 4), let the length from sub-FBGi to sub-FBG(i+1) of two adjacent sub-FBGs (the spacing between adjacent sub-FBGs) be $L_{i(i+1)}$ (i=1 to 3) [$L_{i(i+1)}=Lg_i+Ls_i$], and let the reflectivity of each FBGi be $R_i$.

The length $Lg_i$, the length $Ls_i$, the spacing $L_{i(i+1)}$ and reflectivity $R_i$ may be referred to as simply Lg, Ls, L and R, collectively.

Figure 5:
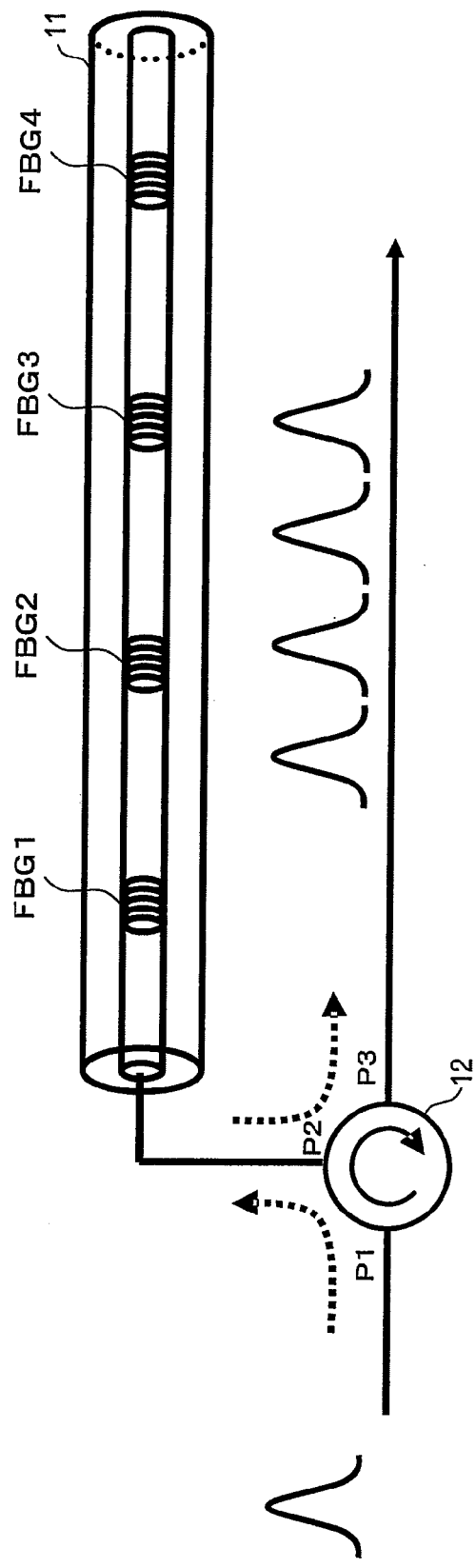
FIG. 5 illustrates input short optical pulses and output reflected pulses of an SFBG.

FIG. 5 illustrates an example of the configuration of an optical correlator of code length 4. The optical correlator is provided, in addition to the SFBG 11, with a 3-port optical circulator 12 for introducing incident light to the SFBG 11 and extracting reflected light from the SFBG 11.

When the light input/output end of the SFBG 11 is connected to port P2 of the 3-port optical circulator 12 and one short optical pulse impinges upon port P1 of the optical circulator 12, this short optical pulse is input to the SFBG 11 and, while propagating within the core, is reflected (Bragg-diffracted) successively by each of the FBGs and enters port P2 of the optical circulator 12. From port P3 of optical circulator 12, therefore, a train of four short optical pulses exhibiting a time interval Ts is extracted. If the reflectivity R of each FBG is very small (1<<R), differences in the intensities of the four pulses in the output train of short optical pulses will be very small.

The above-mentioned time interval Ts is given by the following equation using the spacing L between adjacent sub-FBGs:

$$Ts \approx 2n_{core}L/c \quad \text{Eq. (5)}$$

Here c is the velocity of light and $n_{core}$ is the effective refractive index of the core at the gaps.

The pulse width of the short optical pulse that impinges upon port P1 of optical circulator 12 preferably is equal to or less than the time interval Ts, which is decided by Equation (5), of the train of reflected optical pulses.

It is required that the reflectivities $R_1$, $R_2$ $R_3$, $R_4$ of the sub-FBGs of SFBG 11 be adjusted in such a manner that, with respect to incidence of a single short optical pulse, there will be output a pulse train of pulses of intensities that are equal or substantially equal or made to conform to the amplitude of any one code word.

If the reflectivities R of the sub-FBGs of SFBG 11 are very small, as mentioned above, with respect to incidence of a single short optical pulse, then it can be said that the reflectivities have been adjusted so as to represent one code word in the complex orthogonal codes expressed by Equation (2) (shown in FIG. 1A). Another method of adjustment (in order to make the intensities of each of the pulses of the pulse train equal or substantially equal) is to set the reflectivities of the FBGs higher as distance from the input/output end of the SFBG 11 increases ($R_1 < R_2 < R_3 < R_4$).

It is required that the phase differences between adjacent sub-FBGs within the SFBG 11 be adjusted in such a manner that, with respect to incidence of a single short optical pulse, the phase differences of the carrier waves between two short optical pulses reflected by adjacent sub-FBGs will match the phase differences between adjacent elements of one code word of the complex orthogonal codes expressed by Equation (2) (shown in FIG. 1A). This point is described below.

With regard to a light wave that has entered the SFBG 11 from the input/output end (the left end in FIG. 5) thereof, an optical path difference between a reflected light wave that returns to the input/output end owing to reflection by a preceding FBGi of adjacent sub-FBGs and a reflected light wave that returns to the input/output end owing to reflection by the succeeding FBG(i+1) is given by the following expression:

$$2n_{core}L \quad \text{Eq. (6)}$$

For the phase difference (represented by $\Delta\phi_{12}$, $\Delta\phi_{23}$, $\Delta\phi_{34}$, etc. in FIG. 4) of the two reflected light waves (carrier waves) is zero at the Bragg wavelength $\lambda_{Bragg}$, it will suffice if the optical path difference represented by expression (6) is a positive whole-number multiple of the Bragg wavelength $\lambda_{Bragg}$.

For the phase difference of the two reflected waves (carrier waves) is $\pi/2$ at the Bragg wavelength $\lambda_{Bragg}$, it will suffice if the optical path difference represented by expression (6) is $(4k+1)/4$ (where k is 0 or a positive integer) times the Bragg wavelength $\lambda_{Bragg}$.

For the phase difference of the two reflected waves (carrier waves) is $\pi$ at the Bragg wavelength $\lambda_{Bragg}$ it will suffice if the optical path difference represented by expression (6) is $(2k+1)/2$ (where k is 0 or a positive integer) times the Bragg wavelength $\lambda_{Bragg}$.

For the phase difference of the two reflected waves (carrier waves) is $3\pi/2$ at the Bragg wavelength $\lambda_{Bragg}$, it will suffice if the optical path difference represented by expression (6) is $(4k+3)/4$ (where k is 0 or a positive integer) times the Bragg wavelength $\lambda_{Bragg}$.

In relation to the optical correlator (in both the encoder 10 and decoder 20) of code length 4, the optical path difference represented by expression (6) in the optical correlators of the optical transmitter 3i and optical receiver 4i, for example, is adjusted beforehand in such a manner that the phase difference of the two reflected waves (carrier waves) resulting from reflection by two adjacent FBGs will be zero in case of i=1 (code word $c_1$), $\pi/2$ in case of i=2 (code word $c_2$), $\pi$ in case of i=3 (code word $c_3$) and $3\pi/2$ in case of i=4 (code word $c_4$).

Figure 6:
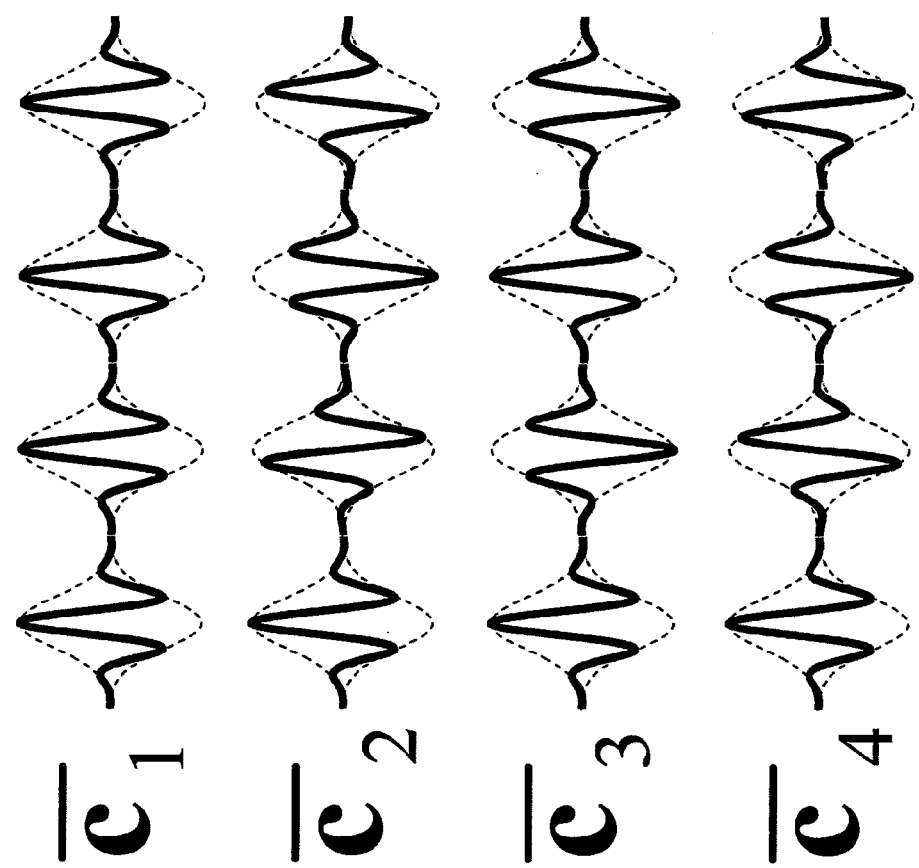
FIG. 6 is a waveform diagram illustrating code words and phase differences between reflected light waves due to adjacent FBGs of a carrier wave ascribable to the code words.

The relationship between the code words and the carrier waves of the trains of four short optical pulses that are output from the SFBG 11 is illustrated in FIG. 6. The dashed lines indicate the envelopes of the carrier waves. When the envelope is indicated solely by the intensity thereof, the envelope becomes the train of four short optical pulses shown in FIG. 5. The carrier waves, which are indicated by the bold solid lines, are drawn intentionally to have a low frequency (long wavelength) in order to make a shift in these phases easier to comprehend. It will be understood that the phase differences of the carrier waves are 0, $\pi/2$, $\pi$, $3\pi/2$ between the FBGs in conformity with the code words. FIG. 1C expresses the phase differences $\Delta\phi_{12}, \Delta\phi_{23}, \Delta\phi_{34}$ corresponding to the code words in the form of a matrix.

In the optical correlation signal that is output from the correlator (the configuration shown in FIG. 5) within the encoder 10 provided in each transmitter 3i, the phase difference corresponding to the code word that has been allocated to each transmitter 3i (i=1 to N; here N=4 holds) is produced between the carriers of two adjacent pulses in the train of short optical pulses.

In the correlator (the configuration shown in FIG. 5) within the decoder 20 provided in the receiver 4i, an optical signal representing the correlation waveform between the code word that produced the input optical correlation signal (received optical signal) and the code word that has been allocated to this receiver 4i is output from port P3 of the optical circulator 12.

In a case where the code word in the optical transmitter and the code word that has been allocated to the SFBG 11 of the optical correlator in the decoder of the receiver are identical, the optical signal extracted from the optical circulator 12 takes on the autocorrelation waveform of this code word. If the two code words are different, then the optical signal takes on the cross-correlation waveform of these two code words.

Figure 7A:
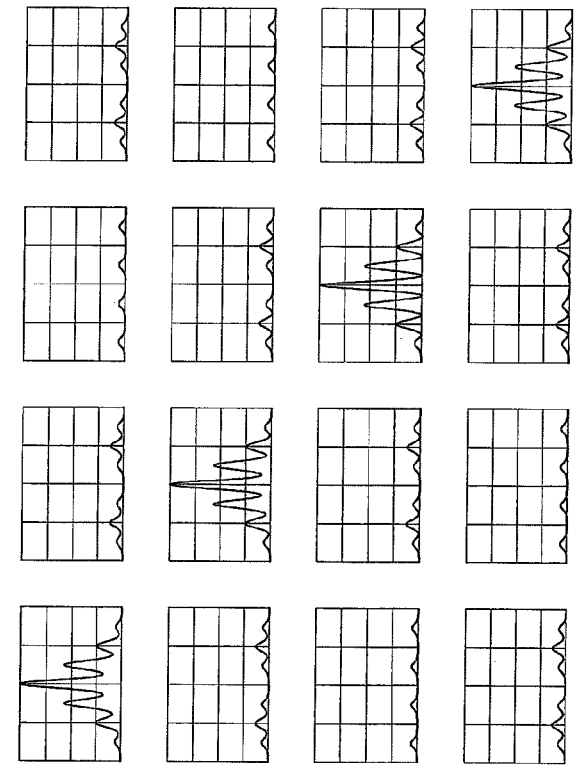
FIG. 7A illustrates computational example of correlation waveforms in a case where use is made of 2-phase Hadamard codes mentioned in the background art.

FIG. 7A illustrates correlation waveforms in N=4 real orthogonal codes obtained from a 2-phase Hadamard matrix used heretofore.

Figure 7B:
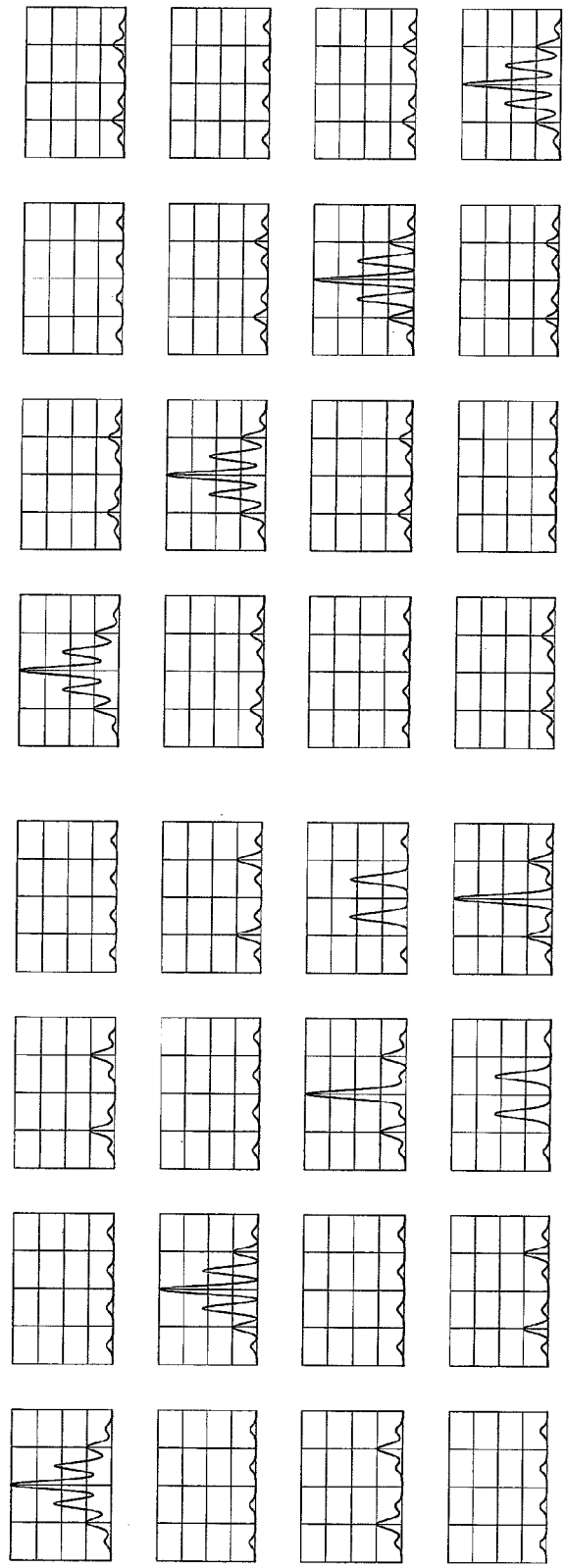
FIG. 7B illustrates a computational example of correlation waveforms in a case where use is made of complex orthogonal codes.
Figure 8A:
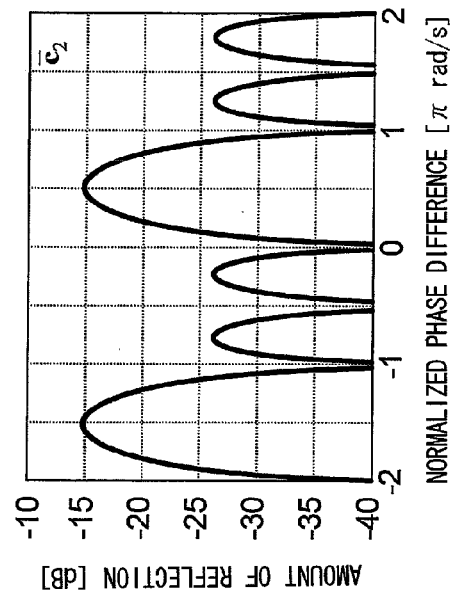
FIGS. 8A, 8B, 8C, 8D illustrate, by computational results of a numerical-value simulation, reflection spectra of an SFBG corresponding to four code words of complex orthogonal codes of code length 4 used in an embodiment.
Figure 8B:
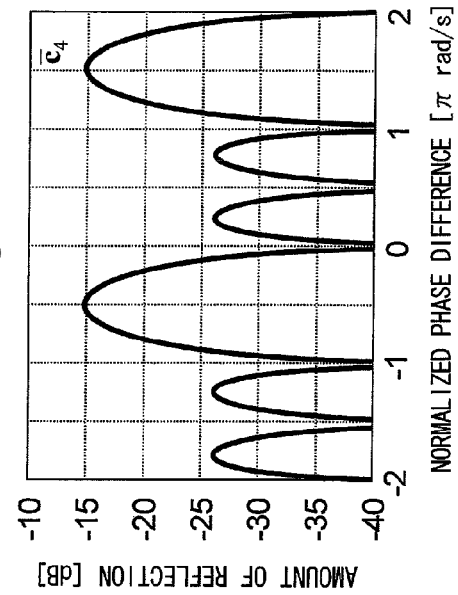
Figure 8C:
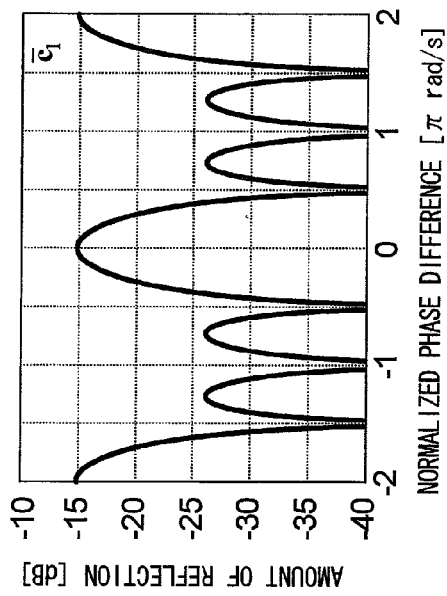
Figure 8D:
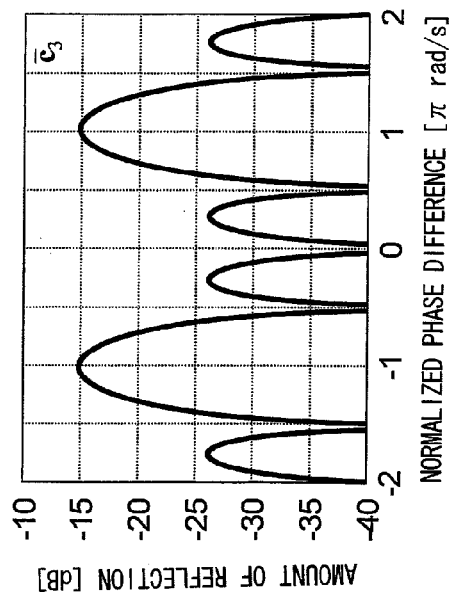

FIG. 7B illustrates correlation waveforms obtained by a combination of two code words from among four code words of N=4 complex orthogonal codes.

In both cases the diagonal elements in the Figures are the autocorrelation waveforms and the non-diagonal elements are the cross-correlation waveforms.

In the case of the correlation waveforms of the 2-phase Hadamard matrix in FIG. 7A, the shapes of the autocorrelation waveforms can be broadly classified into two types, and high peaks can be perceived in the cross-correlation waveforms in the combination of code words of the third row, fourth column and fourth row, third column. The cross-correlation waveforms of the first row, third column; second row, fourth column; third row, first column; fourth row, second column also have high peaks on the order of one-fourth of the peak of the autocorrelation waveforms.

By contrast, in the correlation waveforms of the complex orthogonal codes according to the embodiment of the present invention, the peaks of the cross-correlation waveforms are kept low in any combination of code words.

The maximum value of the peak of the cross-correlation waveforms in case of N=4 is $9/16$ (56.25%) of the autocorrelation waveform with of the 2-phase Hadamard codes and is $2/16$ (12.5%) with the complex orthogonal codes according to this embodiment of the present invention.

In a case where code length is large (a case where N is greater than 4), the difference in the maximum values of the cross-correlation values increases and the effect of reducing cross-correlation by utilizing the complex orthogonal codes according to the present invention becomes more conspicuous.

FIGS. 8A to 8D represent an example of computation of reflection spectra (although laser light has a single wavelength, in actuality a slight distribution of wavelengths exists) of an SFBG in which phase differences between reflected light waves have been adjusted so as to correspond to four code words of N=4 complex orthogonal codes.

The vertical axis is a plot of amount of reflection in dB (decibel) units, and the horizontal axis is a plot of amount of wavelength shift, with respect to center wavelength, represented as phase shift normalized by the center wavelength. The plot is in units of rad/s (radians per second).

The reflection spectra shown in these Figures have high peaks at intervals of $2\pi$ rad/s and have reflectivity valleys at positions of $\pm 0.5\pi$ rad/s, $\pm 1.0\pi$ rad/s, $\pm 1.5\pi$ rad/s with respect to the peaks.

The discrepancies in the four reflection spectra are merely discrepancies in relative peak positions with respect to the center wavelength (Bragg wavelength).

With respect to code word $c_1$ (FIG. 8A), the center wavelength (Bragg wavelength) and the peak wavelength of the reflection spectrum coincide. With regard to the other codes words $c_2$ to $c_4$ (FIGS. 8B to 8D), the reflection spectra shift in increments of $0.5\pi$ rad/s toward the long wavelength side and the valleys of the different reflectivities coincide with the center wavelength (Bragg wavelength).

The bandwidth that can be used in an optical correlator for optical code division multiplexing is $\pm\pi$ rad/s, and it is required that the bandwidth of the short optical pulse signal that impinges upon the SFBG via the optical circulator be equal to or greater than this bandwidth.

In the optical correlator SFBG 11 of the optical transmitter 3i and optical receiver 4i, it will suffice if the corresponding optical transmitter and optical receiver are set beforehand to an optical path difference that will cause a phase difference conforming to one and the same code word to be produced in the carrier waves, as mentioned above. The above-mentioned adjustment of the phase difference between reflected light waves can be performed by precisely adjusting the length of the gaps between the sub-FBGs, or by applying ultraviolet irradiation, heat or stress to the gap portions, etc.

Figure 9:
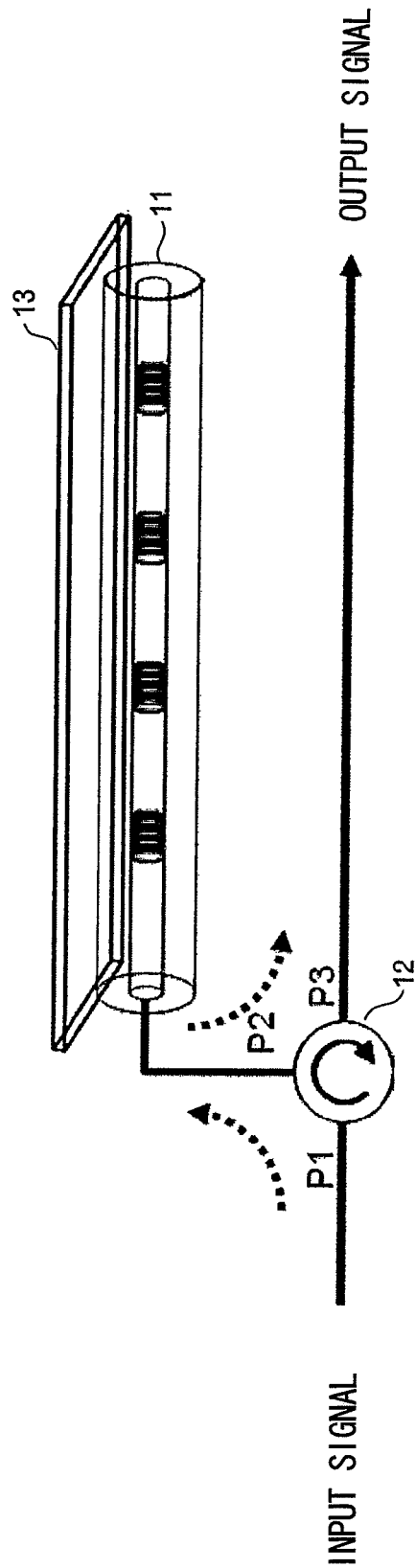
FIG. 9 schematically illustrates the configuration of a general-purpose-type optical correlator.
Figure 10A:
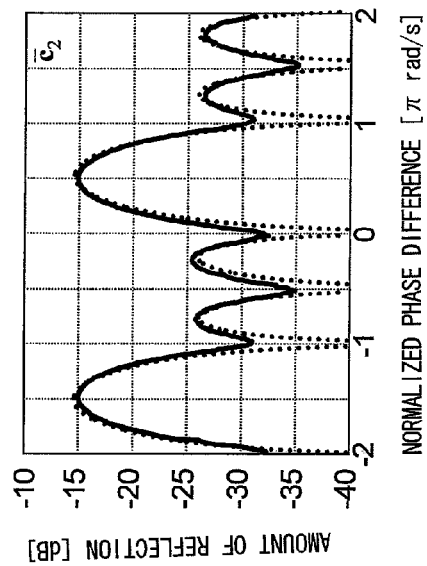
FIGS. 10A, 10B, 10C, 10D illustrate, by result of actual measurement of an actual device, reflection spectra in a case where an SFBG corresponding to a code word $c_1$ of a complex orthogonal code of code length 4 used in an embodiment has been heated by a thermoelectric element.
Figure 10B:
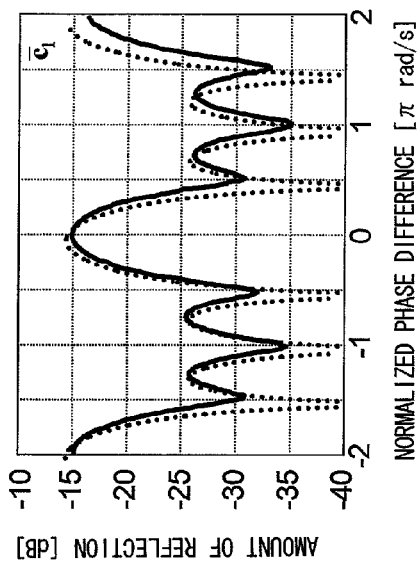
Figure 10C:
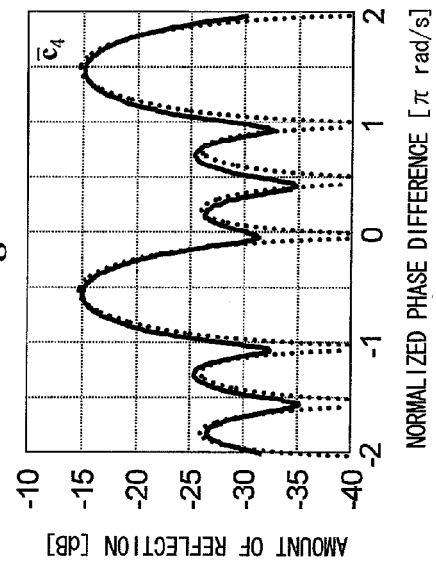
Figure 10D:
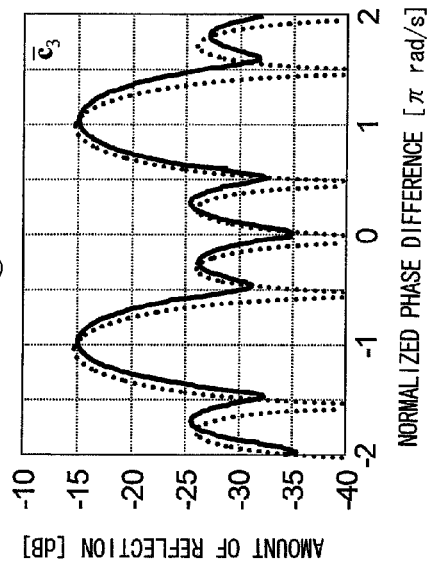

FIG. 9 schematically illustrates an example of the configuration of a general-purpose-type optical correlator in which it is possible to set all of the above-mentioned code words. This optical correlator is applicable to both the encoder and decoder.

The optical correlator has a thermoelectric element 13 for controlling the phase difference (optical path length) between adjacent sub-FBGs in the SFBG 11 by the thermo-optic effect. The entire SFBG 11 is heated or cooled by the thermoelectric element 13.

Specifically, the thermoelectric element 13 is placed in contact with the SFBG 11. Since the temperature of the SFBG 11 is adjusted by the amount of current applied to the thermoelectric element 13 and the refractive index $n_{core}$ within the core of the SFBG 11 is changed by the thermo-optic effect, the time interval Ts of Equation (5) and the optical path difference of Equation (6) are adjusted. At the same time, since the effective refractive index $n_{eff}$ of the sub-FBGs within the SFBG 11 also changes, the Bragg wavelength of Equation (4) changes as well. The desired code word can thus be set.

FIGS. 10A to 10D represent an example of actual measurement of reflection spectra when the Bragg wavelength has been adjusted by a thermoelectric element in an SFBG in which phase difference between reflected light waves has been adjusted so as to correspond to code word $c_i$ of N=4 complex orthogonal codes. The dashed lines in FIGS. 10A to 10D are the examples of computation shown in FIGS. 8A to 8D.

In a case where all of the sub-FBGs receive the same amount of heat, the Bragg wavelengths of all sub-FBGs are adjusted by the same wavelength and the reflection spectrum corresponding to code word $c_1$ shifts toward the long wavelength side.

If the amount of current applied to the thermoelectric element 13 is adjusted in such a manner that the amount of shift of the reflection spectra due to heating matches the amount of shift of the peak wavelength of the reflection spectra with respect to each of the code words of FIGS. 8A to 8D, then the example of actual measurement of the reflection spectrum of bandwidth $\pm\pi$ rad/s, the center of which is the Bragg wavelength that prevailed before heating, will substantially agree with the example of computation of the reflection spectrum.

Thus, in a case where a complex orthogonal code is used as an orthogonal code for optical code division multiplexing, instead of stringently adjusting the phase difference between reflected light waves at the sub-FBGs of an SFBG that implements an optical correlator, it is possible to change over dynamically the complex orthogonal code supported by the optical correlator by adjusting the Bragg wavelengths of all sub-FBGs.

Dynamic changeover of the Bragg wavelength can be implemented by the thermo-optic effect using a thermoelectric element, etc., as in the embodiment above, and can also be implemented by applying tension or stress to the entire SFBG.

The dynamic changeover of the complex orthogonal code can be implemented also by adjusting the phase difference between reflected waves between sub-FBGs of the SFBG by applying heat or stress, etc., to the gap portions between sub-FBGs.

Further, in a case where Yb-ion-added fibers or the like of equal length have been inserted between also sub-FBGs, the dynamic changeover of the complex orthogonal code can be implemented also by introducing light of a wavelength that excites the additive ions of the fibers upon combining this light with an optical signal via a wavelength multiplexing coupler, and utilizing a change in the optically excited refractive index within the fiber.

Figure 11:
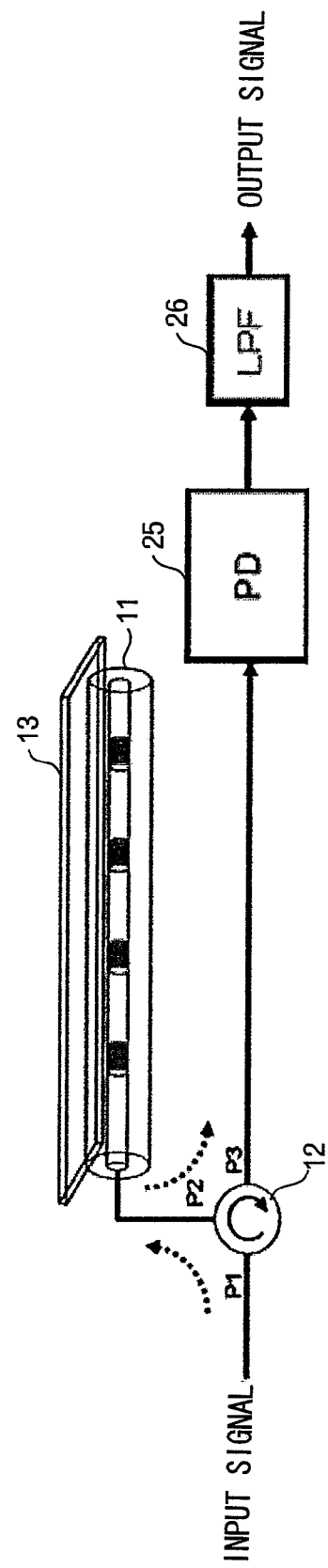
FIG. 11 illustrates the apparatus configuration of a receiver capable of reducing multiplex noise.

FIG. 11 illustrates in concrete form the configuration of the optical receiver shown in FIG. 3. Here the optical correlator having the configuration shown in FIG. 9 is used. By photoelectrically converting the optical correlation signal, which is extracted from this optical correlator, by the photodetector 25 and passing the electrical correlation signal obtained by the photoelectric conversion through the electrical low-pass filter 26, it is possible to reduce (block) multiplex interference signals encoded by complex orthogonal codes other than the complex orthogonal code that has been allocated to this optical correlator. FIG. 11 illustrates the configuration of the apparatus of an embodiment of a method of reducing optical code division multiplex interference.

As mentioned above, it is necessary to adjust the cut-off frequency of the electrical low-pass filter 26 so as to be equal to or greater than the repetition frequency of the optical pulse train that is input to the optical correlator for encoding and, moreover, so as to be sufficiently low in comparison with a frequency given by the reciprocal of the time interval Ts, between adjacent FBG-reflected light waves, decided by the spacing $L_s$ of adjacent sub-FBGs of the SFBG 11.

Figure 12:
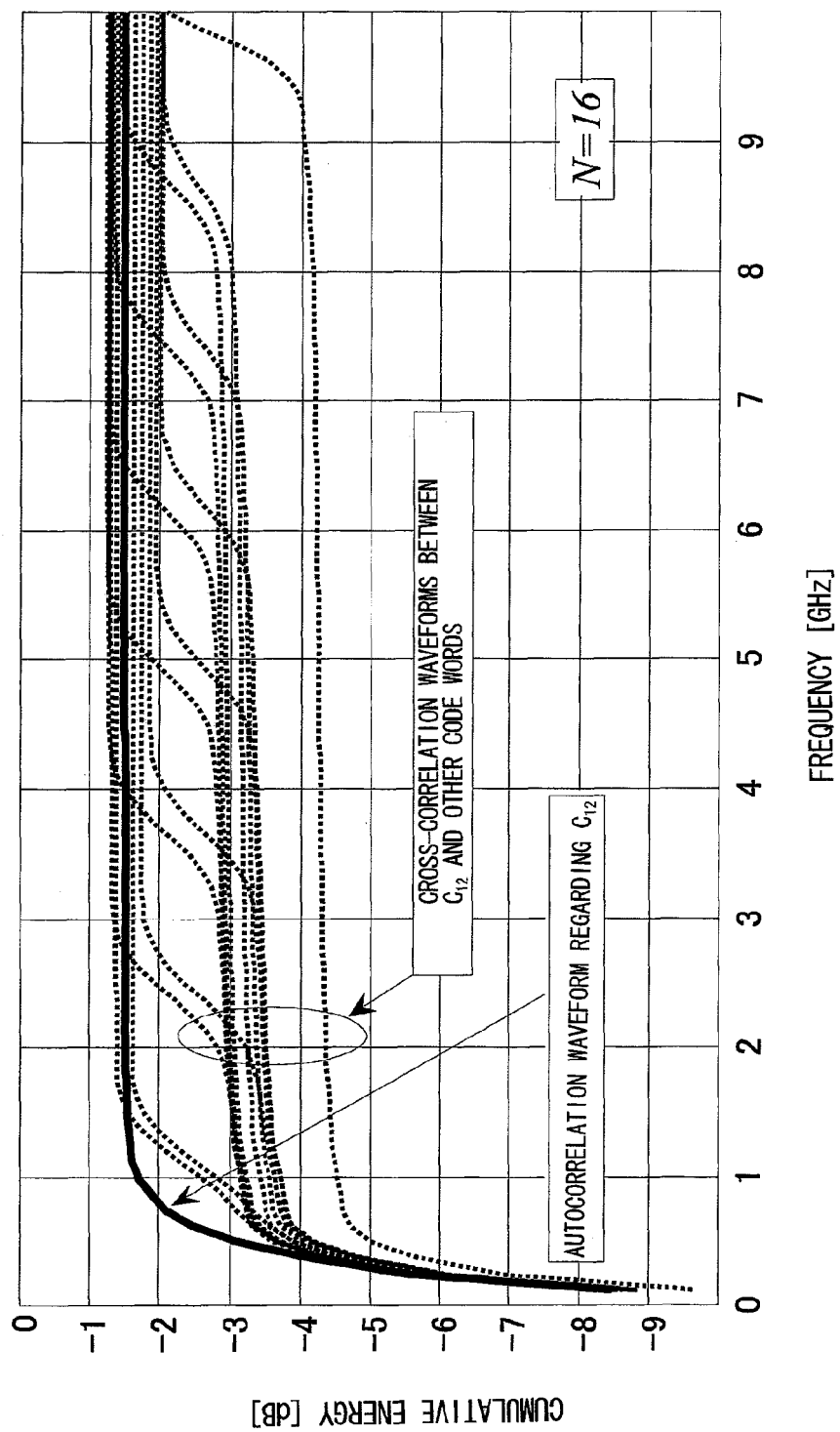
FIG. 12 illustrates a computational example of cumulative energy versus frequency bandwidth of an autocorrelation waveform and cross-correlation waveforms at N=16.

FIG. 12 is a computational example illustrating cumulative energy versus frequency bandwidth of a normalized autocorrelation waveform (the solid line) and normalized cross-correlation waveforms (the dotted lines) in N=16 complex orthogonal codes. All cumulative energies have also been normalized by the energy of each waveform.

With complex orthogonal codes at N=16, there are N−1=15 cross-correlation waveforms and therefore 15 cumulative energies regarding the cross-correlation waveforms of the dotted lines are indicated in overlapping form.

In this case the repetition frequency of the optical pulse train that has been input to the encoding optical correlator is 1 GHz, the time interval Ts decided by the sub-FBG spacing $L_s$ is 50 ps, and the frequency given by the reciprocal this time interval is 20 GHz.

Whereas the cumulative energy of the autocorrelation waveform indicated by the solid line saturates at approximately 1 GHz, most of the cross-correlation waveforms indicated by the dotted lines exhibit cumulative energies that rise and saturate at higher frequencies.

In this embodiment, adjusting the cut-off frequency of the electrical low-pass filter 26 to about 1 GHz (see the dotted lines) makes it possible to further suppress the cross-correlation components, which in principle are inherently small, from 1.5 dB to 2 dB. In particular, it is possible to greatly reduce the effects of multiplex interference at the time of asynchronous multiplexing.

In this embodiment, complex orthogonal codes at N=4, N=8, N=16 are indicated. However, the code length N is not limited to these. A power of 2 is an example. Preferably, N is equal to or greater than 4.

In the foregoing embodiment, the Bragg grating uses fiber Bragg gratings that have been formed in the core of an optical fiber. However, a device in which a Bragg grating has been formed in a planar optical waveguide can be used instead of the SFBG.

Alternatively, instead of the SFBG 11 and optical circulator 12, use can be made of an optical correlator having (1×N)-number of optical demultiplexers, N-number of parallel optical waveguides and (N×1)-number of optical multiplexer and adjusted in such a manner that propagation delay time differences of other parallel optical waveguides in which one waveguide among the N-number of parallel optical waveguides serves as a reference will correspond to time differences between a leading pulse and other pulses of the desired complex orthogonal code, and such that carrier wave phases of each of the optical pulses that are output from the parallel optical waveguides will correspond to phase differences between a leading pulse and other pulses of the desired complex orthogonal code.

The optical demultiplexers, parallel optical waveguides and optical multiplexers in this case can be implemented by optical-fiber-type elements and also as elements of planar optical waveguide type.

What is claimed is:

1. An optical communication system including an optical transmitter and an optical receiver;
wherein the optical transmitter includes an optical correlator, which has been allocated a code word of a complex orthogonal code of code length N represented by any row of an N×N square matrix in which an element of an $m^{th}$ row and $n^{th}$ column is $\exp[2\pi j(m-1)(n-1)/N]$ (where j is an imaginary unit), for optically encoding an optical signal, which is to be transmitted, by this code word, wherein m and n are integer values which are at least 1 and at most N, m designating the $m^{th}$ row and n designating the $n^{th}$ column of the N×N square matrix;
the optical receiver includes an optical correlator, which has been allocated a code word of a complex orthogonal code of code length N represented by any row of an N×N square matrix in which an element of an $m^{th}$ row and $n^{th}$ column is $\exp[2\pi j(m-1)(n-1)/N]$ (where j is an imaginary unit), for optically decoding a received optical signal by this code word; and
said optical correlator of said optical transmitter or said optical receiver includes:
a sampled Bragg grating having a plurality of Bragg gratings disposed serially at regular intervals inside an optical waveguide, reflectivities of these Bragg gratings being adjusted in conformity with amplitude of said allocated code word, and phase differences of light waves reflected by adjacent Bragg gratings being adjusted so as to be equal between all Bragg gratings in conformity with phase differences between adjacent elements of said allocated code word; and
an optical circulator for introducing an input optical signal to said sampled Bragg grating and extracting reflected light waves that are output from said sampled Bragg grating.

2. An optical communication system according to claim 1, including:
a maximum N-number of optical transmitters, wherein an optical correlator of each optical transmitter has been allocated a respective different code word; and
a maximum N-number of optical receivers, wherein an optical correlator of each optical receiver has been allocated a respective different code word.

3. An optical transmitter including an optical correlator, which has been allocated a code word of a complex orthogonal code of code length N represented by any row of an N×N square matrix in which an element of an $m^{th}$ row and $n^{th}$ column is $\exp[2\pi j(m-1)(n-1)/N]$ (where j is an imaginary unit), for optically encoding an optical signal, which is to be transmitted, by this code word, wherein m and n are integer values which are at least 1 and at most N, m designating the $m^{th}$ row and n designating the $n^{th}$ column of the N×N square matrix;
wherein said optical correlator includes:
a sampled Bragg grating having a plurality of Bragg gratings disposed serially at regular intervals inside an optical waveguide, reflectivities of these Bragg gratings being adjusted in conformity with amplitude of said allocated code word, and phase differences of light waves reflected by adjacent Bragg gratings being adjusted so as to be equal between all Bragg gratings in conformity with phase differences between adjacent elements of said allocated code word; and
an optical circulator for introducing an input optical signal to said sampled Bragg grating and extracting reflected light waves that are output from said sampled Bragg grating.

4. An optical receiver including an optical correlator, which has been allocated a code word of a complex orthogonal code of code length N represented by any row of an N×N square matrix in which an element of an $m^{th}$ row and $n^{th}$ column is $\exp[2\pi j(m-1)(n-1)/N]$ (where j is an imaginary unit), for optically decoding a received optical signal by this code word, wherein m and n are integer values which are at least 1 and at most N, m designating the $m^{th}$ row and n designating the $n^{th}$ column of the N×N square matrix;
wherein said optical correlator includes:
a sampled Bragg grating having a plurality of Bragg gratings disposed serially at regular intervals inside an optical waveguide, reflectivities of these Bragg gratings being adjusted in conformity with amplitude of said allocated code word, and phase differences of light waves reflected by adjacent Bragg gratings being adjusted so as to be equal between all Bragg gratings in conformity with phase differences between adjacent elements of said allocated code word; and
an optical circulator for introducing an input optical signal to said sampled Bragg grating and extracting reflected light waves that are output from said sampled Bragg grating.

5. An optical receiver according to claim 4, further having: a photoelectric converting circuit for photoelectrically converting an optical correlation signal, which is output from said optical correlator, and outputting an electrical signal; and a low-pass filter for reducing multiplexed interference signals, which have been produced owing to encoding by code words of complex orthogonal codes other than the code word that has been allocated to said optical correlator, from the output electrical signal of the photoelectric converting circuit.

6. An optical correlator including:
a sampled Bragg grating having a plurality of Bragg gratings, which have been allocated a code word of a complex orthogonal code of code length N represented by any row of an N×N square matrix in which an element of an $m^{th}$ row and $n^{th}$ column is $\exp[2\pi j(m-1)(n-1)/N]$ (where j is an imaginary unit), and which are disposed serially at regular intervals inside an optical waveguide, wherein m and n are integer values which are at least 1 and at most N, m designating the $m^{th}$ row and n designating the $n^{th}$ column of the N×N square matrix, reflectivities of these Bragg gratings being adjusted in conformity with amplitude of said allocated code word, and phase differences of light waves reflected by adjacent Bragg gratings being adjusted so as to be equal between all Bragg gratings in conformity with phase differences between adjacent elements of said allocated code word; and an optical circulator for introducing an input optical signal to said sampled Bragg grating and extracting reflected light waves that are output from said sampled Bragg grating.

7. An optical correlator according to claim 6, wherein said sampled Bragg grating is a sampled optical fiber Bragg grating.

8. An optical correlator according to claim 6, further having physical-quantity application means for applying a physical quantity to the entirety of the optical waveguide of said sampled Bragg grating, thereby changing equally the phase differences or Bragg reflection wavelengths of light waves reflected by adjacent Bragg gratings, and holding these at mutually equal desired values.

9. An optical communication method comprising:
in an optical transmitting side, which is allocated a code word of a complex orthogonal code of code length N represented by any row of an N×N square matrix in which an element of an $m^{th}$ row and $n^{th}$ column is exp$[2\pi j(m-1)(n-1)/N]$ (where j is an imaginary unit), generating N-number of light waves from a light wave representing an optical signal to be transmitted, optically encoding an optical, which is to be transmitted, so as to produce equal phase differences, which are defined by the allocated code word, between adjacent ones of these N-number of light waves on a time axis, and transmitting the encoded optical signal, wherein m and n are integer values which are at least 1 and at most N, m designating the $m^{th}$ row and n designating the $n^{th}$ column of the N×N square matrix;
in a receiving side, optically decoding a received optical signal by an allocated code word using an optical correlator, which has been allocated the code word of a complex orthogonal code of code length N represented by any row of an N×N square matrix in which an element of an $m^{th}$ row and $n^{th}$ column is exp$[2\pi j(m-1)(n-1)/N]$ (where j is an imaginary unit), for outputting an optical signal representing strong autocorrelation in a case where this code word is identical with a code word that was used to encode the received optical signal, and outputting an optical signal representing cross-correlation that is weak in comparison with the autocorrelation output in a case where the code word is different; and
photoelectrically converting an optical correlation signal that is output from said optical correlator to obtain an electrical signal, and reducing multiplexed interference signals in said electrical signal, the multiplexed interference signals having been produced owing to encoding by code words of complex orthogonal codes other than the code word that has been allocated to said optical correlator.

10. A code changeover method regarding an optical correlator that includes:
a sampled Bragg grating having a plurality of Bragg gratings disposed serially at regular intervals inside an optical waveguide, reflectivities of these Bragg gratings being adjusted in conformity with amplitude of one code word of a complex orthogonal code of code length N in which each row of an N×N square matrix in which an element of an $m^{th}$ row and $n^{th}$ column is exp$[2\pi j(m-1)(n-1)/N]$ (where j is an imaginary unit) is adopted as a code word, and phase differences of light waves reflected by adjacent Bragg gratings being adjusted so as to be equal between all Bragg gratings in conformity with phase differences between adjacent elements of one code word of said complex orthogonal codes, wherein m and n are integer values which are at least 1 and at most N, m designating the $m^{th}$ row and n designating the $n^{th}$ column of the N×N square matrix; and
a mechanism for introducing an input optical signal to said sampled Bragg grating by an optical circulator and extracting reflected light waves, which are output from said sampled Bragg grating, by said optical circulator;
the method comprising applying a physical quantity to the entirety of the optical waveguide of said sampled Bragg grating, thereby changing equally the phase differences or Bragg reflection wavelengths of light waves reflected by adjacent Bragg gratings, and holding these at mutually equal desired values, thereby changing over the one code word of said complex orthogonal code to another code word obtained from a different row of the same square matrix in said optical correlator.

* * * * *